(12) United States Patent
Han et al.

(10) Patent No.: US 8,702,310 B2
(45) Date of Patent: Apr. 22, 2014

(54) HYDRODYNAMIC BEARING ASSEMBLY AND SPINDLE MOTOR INCLUDING THE SAME

(75) Inventors: Seung Heon Han, Gyunggi-do (KR); Hong Joo Lee, Gyunggi-do (KR); Hyun Ho Shin, Gyunggi-do (KR); Sung Yeol Park, Gyunggi-do (KR); Ju Ho Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/570,540

(22) Filed: Aug. 9, 2012

(65) Prior Publication Data
US 2013/0322792 A1    Dec. 5, 2013

(30) Foreign Application Priority Data
Jun. 5, 2012    (KR) .................. 10-2012-0060516

(51) Int. Cl.
*F16C 32/06*    (2006.01)
(52) U.S. Cl.
USPC .......................................... 384/107; 384/114
(58) Field of Classification Search
USPC ............ 384/100, 107, 114, 115, 120; 310/90; 360/99.07, 99.08
See application file for complete search history.

(56) References Cited

U.S. PATENT DOCUMENTS

| | | | | |
|---|---|---|---|---|
| 6,661,131 | B2* | 12/2003 | Fukutani | 310/90 |
| 6,832,853 | B2* | 12/2004 | Fujinaka | 384/100 |
| 6,905,247 | B2* | 6/2005 | Kishi | 384/120 |
| 7,608,957 | B2* | 10/2009 | Yun | 310/90 |
| 8,106,555 | B2* | 1/2012 | Park | 310/90 |
| 8,475,049 | B2* | 7/2013 | Oh et al. | 384/114 |
| 2003/0113045 | A1* | 6/2003 | Fujinaka | 384/100 |
| 2009/0067765 | A1 | 3/2009 | Kim | |
| 2011/0200279 | A1* | 8/2011 | Goto | 384/107 |
| 2013/0051714 | A1* | 2/2013 | Jung et al. | 384/100 |
| 2013/0071054 | A1* | 3/2013 | Harada et al. | 384/107 |

FOREIGN PATENT DOCUMENTS

KR    10-2006-0114882    11/2006

* cited by examiner

*Primary Examiner* — James Pilkington

(57) ABSTRACT

There are provided a hydrodynamic bearing assembly and a spindle motor including the same. The hydrodynamic bearing assembly includes: a sleeve including a shaft hole to have a shaft rotatably installed therein; and a cover member covering the shaft hole at a lower portion of the shaft hole in an axial direction, wherein an inner surface of the sleeve is provided with depression parts depressed in an outer diameter direction between upper and lower portions of the sleeve and portions in which radial bearings are formed, such that the portions in which the radial bearings are formed are provided with bearing closure adhesion parts allowing the portions in which the radial bearings are formed to be closer to the shaft than portions other than the portions in which the radial bearings are formed.

6 Claims, 5 Drawing Sheets

HYDRODYNAMIC BEARING ASSEMBLY AND SPINDLE MOTOR INCLUDING THE SAME

CROSS-REFERENCE TO RELATED APPLICATIONS

This application claims the priority of Korean Patent Application No. 10-2012-0060516 filed on Jun. 5, 2012, in the Korean Intellectual Property Office, the disclosure of which is incorporated herein by reference.

BACKGROUND OF THE INVENTION

1. Field of the Invention

The present invention relates to a hydrodynamic bearing assembly and a spindle motor including the same.

2. Description of the Related Art

A hard disk drive (HDD), an information storage device, reads data stored on a disk or writes data to a disk using a read/write head.

A hard disk drive requires a disk driving device capable of driving the disk. In the disk driving device, a small spindle motor is commonly used.

This small spindle motor uses a hydrodynamic bearing assembly. A lubricating fluid is interposed between a shaft and a sleeve of the hydrodynamic bearing assembly, such that the shaft is supported by fluid pressure generated in the lubricating fluid.

In this case, two dynamic pressure generation grooves are generally formed in upper and lower portions of the shaft or the sleeve in an axial direction in order to form at least two bearing axes, thereby allowing the shaft to rotate in a stable position. That is, at the time of driving of the motor, the lubricating fluid stored in the upper and lower portions of the dynamic pressure generation groove is concentrated on the dynamic pressure generation groove, such that at least two bearing axes are formed.

However, in the case in which the lubricating fluid between the two dynamic pressure generation grooves is excessively pumped in one or in two directions due to an error in manufacturing, vibrations, an external impact, or the like, an amount of the lubricating fluid in a bearing clearance between the two dynamic pressure generation grooves may suddenly be insufficient, such that negative pressure may be generated. In the case that negative pressure is generated, noise, vibrations, or the like, may be generated in the motor, such that the motor may be unstably operated.

Further, when the negative pressure is generated, air bubbles are formed in the lubricating fluid or existing bubbles are enlarged, such that motor performance may be deteriorated.

Therefore, research into a new structure of a bearing assembly capable of improving operational performance of a motor and preventing the generation of negative pressure has been urgently demanded.

The following Related Art Document has disclosed a spindle motor using a hydrodynamic bearing and suggests a structure for preventing the generation of negative pressure.

RELATED ART DOCUMENT

Korean Patent Laid-open Publication No. 2006-0114882

SUMMARY OF THE INVENTION

An aspect of the present invention provides a hydrodynamic bearing assembly capable of improving motor performance by preventing the generation of negative pressure.

Another aspect of the present invention provides a motor that may be stably operated even in the case that vibrations, external impacts, and the like, are applied from the outside thereto.

Another aspect of the present invention provides a motor having a structure capable of rapidly discharging gas included in a lubricating fluid to the outside.

According to an aspect of the present invention, there is provided a hydrodynamic bearing assembly including: a sleeve including a shaft hole to have a shaft rotatably installed therein; and a cover member covering the shaft hole at a lower portion of the shaft hole in an axial direction, wherein an inner surface of the sleeve is provided with depression parts depressed in an outer diameter direction between upper and lower portions of the sleeve and portions in which radial bearings are formed, such that the portions in which the radial bearings are formed are provided with bearing closure adhesion parts allowing the portions in which the radial bearings are formed to be closer to the shaft than portions other than the portions in which the radial bearings are formed, the bearing closure adhesion parts being provided with through-holes penetrating therethrough in the axial direction so as to be in communication with the depression parts.

The through-holes may be linearly disposed in the axial direction.

The hydrodynamic bearing assembly may further include a thrust plate provided with the shaft so as to be positioned between a cap member fixed to an upper portion of the sleeve and the sleeve.

The hydrodynamic bearing assembly may further include a stopper provided with the shaft so as to be caught by a lower end of the lowermost bearing closure adhesion part among the bearing closure adhesion parts provided in the sleeve.

According to another aspect of the present invention, there is provided a hydrodynamic bearing assembly including: a first sleeve; a second sleeve including a shaft hole to have a shaft rotatably installed therein and fixed to an inner surface of the first sleeve; and a cover member covering the shaft hole at a lower portion of the shaft hole in an axial direction, wherein the inner surface of the first sleeve and an outer surface of the second sleeve form a space part therebetween so as to be spaced apart from each other, wherein an inner surface of the second sleeve is provided with depression parts depressed in an outer diameter direction between portions in which radial bearings are formed, such that the portions in which the radial bearings are formed are provided with bearing closure adhesion parts allowing the portions in which the radial bearings are formed to be closer to the shaft than portions other than the portions in which the radial bearings are formed, wherein upper and lower portions of the space part are provided with first and third through-holes that are in communication with the shaft hole, and wherein the space part is provided with a second through-hole that is in communication with the depression part.

Upper and lower portions of the second sleeve may be depressed in the outer diameter direction so as to be closely coupled to the first sleeve.

The cover member may be provided integrally with the second sleeve.

The first and second through-holes may be linearly disposed in the axial direction.

The hydrodynamic bearing assembly may further include a thrust plate provided with the shaft so as to be positioned between a cap member fixed to an upper portion of the first sleeve and the first sleeve.

The hydrodynamic bearing assembly may further include a stopper provided with the shaft so as to be caught by a lower end of the lowermost bearing closure adhesion part among the bearing closure adhesion parts provided in the second sleeve.

The depression parts may be closely adhered to the inner surface of the first sleeve.

According to another aspect of the present invention, there is provided a spindle motor including: the hydrodynamic bearing assembly as described above; a base plate having the hydrodynamic bearing assembly mounted thereon; and a hub fixed to an upper portion of the shaft.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will now be described in detail with reference to the accompanying drawings. However, it should be noted that the spirit of the present invention is not limited to the embodiments set forth herein and that those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, when it is determined that the detailed description of the known art related to the present invention may obscure the gist of the present invention, a detailed description thereof will be omitted.

Figure 1:
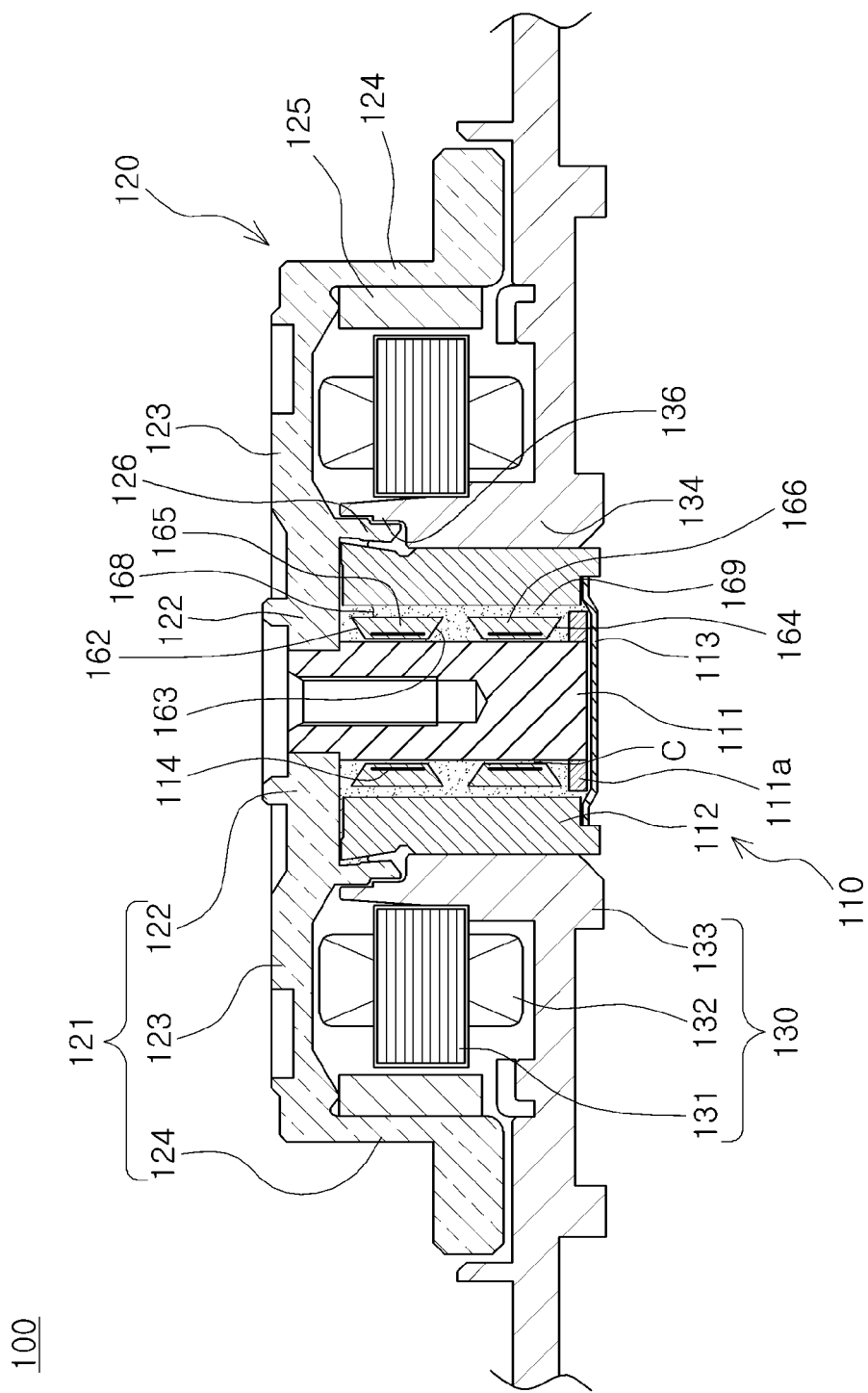
FIGS. 1 through 4 are cross-sectional views of a spindle motor according to an embodiment of the present invention.

FIG. 1 is a schematic cross-sectional view of a spindle motor according to an embodiment of the present invention.

Referring to FIG. 1, the spindle motor 100 according to the embodiment of the present invention may include a hydrodynamic bearing assembly 110 including a shaft 111 and a sleeve 112, a rotor 120 including a hub 121, and a stator 130 including a core 131 having a coil 132 wound therearound.

The hydrodynamic bearing assembly 110 may include the shaft 111, the sleeve 112, a stopper 111a, and the hub 121, wherein the hub 121 may be a component configuring the hydrodynamic bearing assembly 110 while simultaneously configuring a rotor 120 to be described below.

In addition, a rotating member assembly may be a component including the shaft 111 and the hub 121 mounted on the shaft 111.

Terms with respect to directions will be first defined. As viewed in FIG. 1, an axial direction refers to a vertical direction based on the shaft 111, and an outer diameter or inner diameter direction refers to a direction toward an outer edge of the hub 121 based on the shaft 111 or a direction toward the center of the shaft 111 based on the outer edge of the hub 121.

Further, in the following description, a rotating member may be a rotating member such as the shaft 111, the rotor 120 including the hub 121, the magnet 125 mounted on the rotor 120, and the like, and a fixed member, a member other than the rotating member, may be a member that is fixed in relation to the rotating member, such as the sleeve 112, the stator 130, a base member, and the like.

In addition, a communication path between an interface of a lubricating fluid and air indicates a path through which the interface of the lubricating fluid is connected to the outside of the spindle motor and may have air introduced and discharged there through.

The sleeve 112 may support the shaft 111 so that an upper end of the shaft 111 protrudes upwardly in an axial direction. The sleeve 112 may be formed by forging Cu or Al or sintering a Cu—Fe-based alloy powder or a SUS-based powder. However, the sleeve 112 is not limited to being manufactured in this scheme, but may be manufactured in various schemes.

Here, the shaft 111 may be inserted into a shaft hole of the sleeve 112 so as to have a micro clearance therebetween to serve as a bearing clearance C. The bearing clearance C may be filled with a lubricating fluid. At least one of an outer peripheral surface of the shaft 111 and an inner peripheral surface of the sleeve 112 may be provided with upper and lower radial dynamic pressure grooves 114. Therefore, the rotation of the shaft 111 may be smoothly supported by a hydrodynamic radial bearing formed at the time of rotation of the shaft 111.

The radial dynamic pressure groove 114 may be formed in the inner surface of the sleeve 112, an inner portion of the shaft hole of the sleeve 112, and generate pressure such that the shaft 111 may rotate smoothly in a state in which the shaft 111 is spaced apart from the sleeve 112 by a predetermined interval at the time of rotation thereof.

However, the radial dynamic pressure groove 114 is not limited to being formed in the inner surface of the sleeve 112 as described above, but may also be formed in an outer peripheral portion of the shaft 111. In addition, the number of radial dynamic pressure grooves 114 is not limited.

The radial dynamic pressure groove 114 may have at least one of a herringbone pattern, a spiral pattern, and a helix pattern. However, the radial dynamic pressure groove 114 may have any shape as long as radial dynamic pressure may be generated thereby.

In addition, an inner surface of the sleeve 112 may be provided with depression parts depressed in the outer diameter direction between upper and lower portions of the sleeve 112 and portions in which the radial bearings are formed. The portions in which the radial bearings are formed may be provided with bearing closure adhesion parts allowing the portions in which the radial bearings are formed to be more adjacent to the shaft 111 as compared to portions other than the portions in which the radial bearings are formed by the depression parts.

The bearing closure adhesion parts may include a first bearing closure adhesion part 165 positioned in an upper portion and a second bearing closure adhesion part 166 positioned in a lower portion. This case may correspond to the case in which radial bearings are provided as pairs in upper and lower portions. Therefore, when the number of radial bearings increases, the number of bearing closure adhesion parts may also increase. Each of the first and second bearing closure adhesion parts 165 and 166 may include a radial dynamic pressure groove 114 formed in an inner surface thereof.

Here, the depression parts may include a first depression part 162 positioned in an upper portion, a second depression part 163 positioned in a central portion, and a third depression part 164 positioned in a lower portion.

The sleeve 112 may be provided with through-holes allowing upper and lower portions thereof to be in communication with each other. The through-holes may include a first through-hole 168 penetrating through the first bearing closure adhesion part 165 in the axial direction and a second through-hole 169 penetrating through the second bearing closure adhesion part 166 in the axial direction.

The first and second through-holes 168 and 169 may be linearly disposed in the axial direction. Therefore, the through-holes may be easily manufactured.

The upper and lower portions of the sleeve 112 may be in communication with each other by the through-holes, and a bearing clearance C between the radial bearings provided as pairs in the upper and lower portions may be in communication with the through-holes.

With the structure described above, pressure in the lubricating fluid in the hydrodynamic bearing assembly 110 may be dispersed to maintain a balance thereof, and air bubbles, or the like, present in the hydrodynamic bearing assembly 110 may be moved so as to be discharged by circulation.

Here, a lower end of the sleeve 112 may be provided with the stopper 111a protruding from a lower end portion of the shaft 111 in the outer diameter direction. This stopper 111a may be caught by a lower portion of the second bearing closure adhesion part 166 provided in the sleeve 112.

Although not shown, the stopper 111a may be caught by a lower end surface of the sleeve 112, that is, a bottom surface of the sleeve 112 rather than the second bearing closure adhesion part 166 to limit floating of the shaft 111 and the rotor 120.

The spindle motor 100 according to the embodiment of the present invention may use a fluid bearing. Generally, the spindle motor 100 may include a pair of upper and lower radial dynamic pressure grooves 114 for rotational stability to allow two fluid bearings to be formed. However, in the case of the motor using the hydrodynamic bearing, since the rotating member needs to rotate in a state in which it is floated at a predetermined height and thus does not contact a bottom plate (a cover member 113 in the present embodiment), the fluid may be continuously pumped downwardly in an axial direction.

Meanwhile, the sleeve 112 may include the cover member 113 coupled thereto at a lower portion thereof in the axial direction to cover the shaft hole formed in the sleeve 112, thereby preventing leakage of the lubricating fluid.

The cover member 113 may receive the lubricating fluid in the clearance between the cover member 113 and the sleeve 112 to serve as a bearing supporting a lower surface of the shaft 111.

The hub 121, a rotating member coupled to the shaft 111 and rotating together therewith, may configure the rotor 120 while simultaneously configuring the hydrodynamic bearing assembly 110. Hereinafter, the rotor 120 will be described in detail.

The rotor 120 may be a rotating structure provided to be rotatable with respect to the stator 130 and include the hub 121 having an annular ring-shaped magnet 125 provided on an outer peripheral surface thereof, wherein the annular ring-shaped magnet 125 corresponds to a core 131 to be described below, having a predetermined interval therebetween.

In other words, the hub 121 may be a rotating member coupled to the shaft 111 to rotate together therewith.

Here, as the magnet 125, a permanent magnet generating magnetic force having predetermined strength by alternately magnetizing an N pole and an S pole thereof in a circumferential direction may be used.

In addition, the hub 121 may include a first cylindrical wall part 122 fixed to an upper end of the shaft 111, a disk part 123 extended from an end portion of the first cylindrical wall part 122 in the outer diameter direction, and a second cylindrical wall part 124 protruding downwardly from an edge portion of the disk part 123 in the outer diameter direction, wherein the second cylindrical wall part 124 may include the magnet 125 coupled to an inner peripheral surface thereof.

The hub 121 may have a main wall part 126 extended downwardly in the axial direction so as to correspond to an outer portion of the upper portion of the sleeve 112. More specifically, the hub 121 may include the main wall part 126 extended from the disk part 123 downwardly in the axial direction. A liquid-vapor interface sealing the lubricating fluid may be formed between the outer portion of the sleeve 112 and an inner portion of the main wall part 126.

In addition, an inner surface of the main wall part 126 may be tapered, such that an interval between the inner surface of the main wall part 126 and an outer surface of the sleeve 112 widens in the downward axial direction to facilitate the sealing of the lubricating fluid. Further, the outer surface of the sleeve 112 may also be tapered to facilitate the sealing of the lubricating fluid.

In addition, the outer surface of the main wall part 126 may be formed so as to correspond to an inner surface 136 of at least a portion of a mounting part 134 protruding upwardly from a base member 133 and may be stepped or tapered so that an interval between the main wall part 126 and the inner surface 136 widens in the downward axial direction.

The stator 130 may include the coil 132, the core 131, and the base member 133.

In other words, the stator 130 may be a fixed structure including the coil 132 generating electromagnetic force having a predetermined magnitude at the time of the application of power and a plurality of cores 131 having the coil 132 wound therearound.

The core 131 may be fixedly disposed on an upper portion of the base member 133 including a printed circuit board (not shown) having pattern circuits printed thereon, the upper surface of the base member 133 corresponding to the winding coil 132 may be provided with a plurality of coil holes having a predetermined size and penetrating through the base member 133 so as to expose the winding coil 132 downwardly, and the winding coil 132 may be electrically connected to the printed circuit board (not shown) so that external power may be supplied thereto.

The outer peripheral surface of the sleeve 112 may be fixed to the base member 133, and the core 131 having the coil 132 wound therearound may be inserted into the base member 133. In addition, the base member 133 and the sleeve 112 may be connected to each other by applying an adhesive to an inner surface of the base member 133 or an outer surface of the sleeve 112.

In addition, the base member 133 may be provided with the mounting part 134 protruding upwardly in the axial direction. Therefore, the core 131 may be mounted on an outer surface of the base member 133, the above-mentioned sleeve 112 may be fitted into and fixed to a portion of the inner surface thereof, and the outer surface of the main wall part 126 may be formed to correspond to another portion 136 of the inner surface thereof. The mounting part 134 may not be formed to be high so as to correspond to the outer surface of the main wall part 126.

Figure 2:
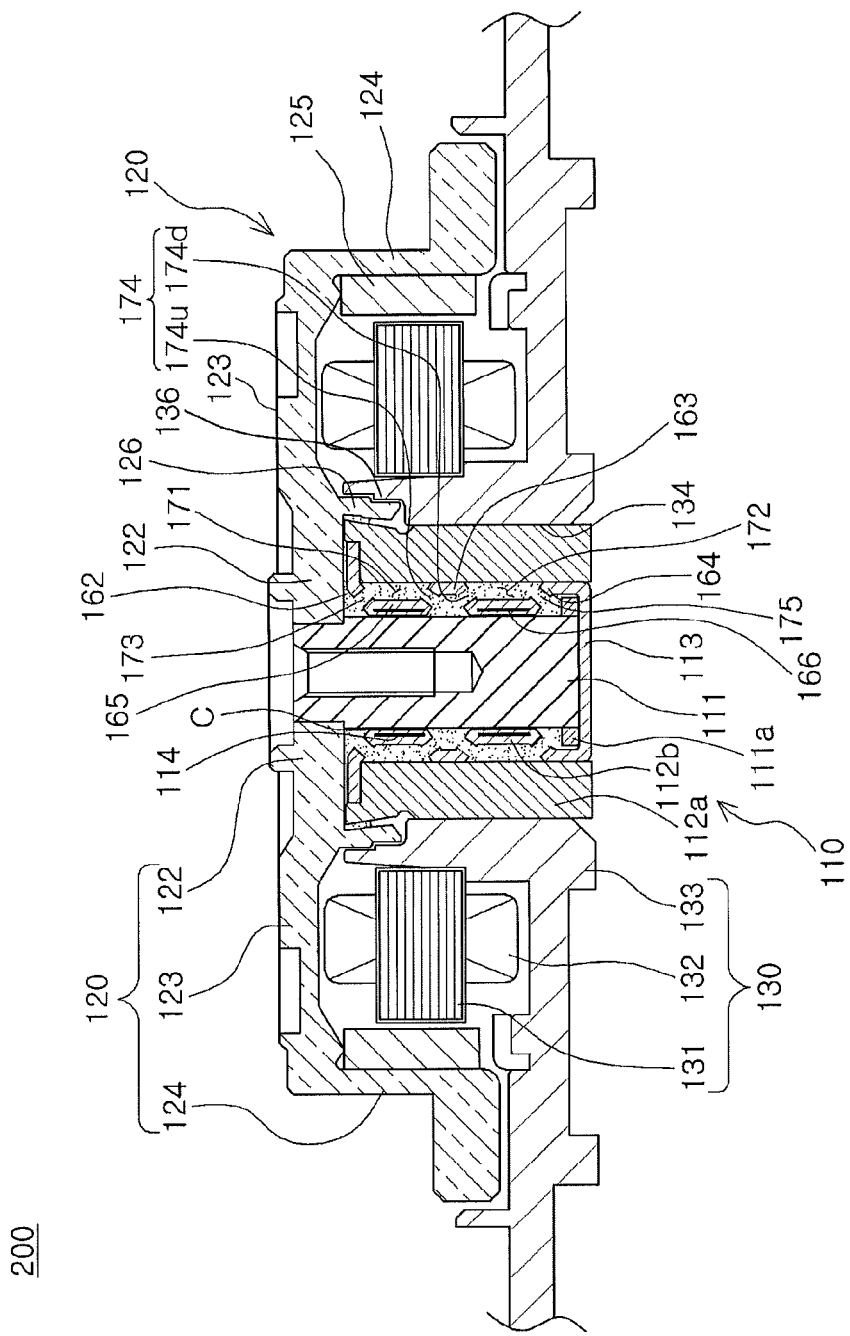

FIG. 2 is a cross-sectional view of the spindle motor according to the embodiment of the present invention.

The spindle motor 200 according to the embodiment of the present invention may include a hydrodynamic bearing assembly 110 including a shaft 111 and sleeves 112a and 112b, a rotor 120 including a hub 121, and a stator 130 including a core 131 having a coil 132 wound therearound.

The spindle motor according to the embodiment of the present invention is different from the spindle motor 100 described with reference to FIG. 1 in that the sleeve is separated into two members. Since other components are the same as those of the spindle motor 100 described with reference to FIG. 1, the same reference numerals will be used to describe the components that are same as those of the spindle motor 100 described with reference to FIG. 1.

The hydrodynamic bearing assembly 110 may include the shaft 111, the sleeves 112*a* and 112*b*, the stopper 111*a*, and the hub 121, wherein the hub 121 may be a component configuring the hydrodynamic bearing assembly 110 while simultaneously configuring a rotor 120 to be described below.

In addition, a rotating member assembly may be a component including the shaft 111 and the hub 121 mounted on the shaft 111.

Terms with respect to directions will be first defined. As viewed in FIG. 2, an axial direction refers to a vertical direction based on the shaft 111, and an outer diameter or inner diameter direction refers to a direction toward an outer edge of the hub 121 based on the shaft 111 or a direction toward the center of the shaft 111 based on the outer edge of the hub 121.

Further, in the following description, a rotating member may be a rotating member such as the shaft 111, the rotor 120 including the hub 121, the magnet 125 mounted on the rotor 120, and the like, and a fixed member, a member other than the rotating member, may be a member that is fixed in relation to the rotating member, such as the sleeves 112*a* and 112*b*, the stator 130, a base member, and the like.

In addition, a communication path between an interface of a lubricating fluid and the outside indicates a path through which the interface of the lubricating fluid is connected to the outside of the spindle motor and may have air introduced and discharged therethrough.

The sleeves 112*a* and 112*b* may support the shaft 111 so that an upper end of the shaft 111 protrudes upwardly in an axial direction. More specifically, the sleeves 112*a* and 112*b* may include a first sleeve 112*a* provided at an outer portion in a radial direction and a second sleeve 112*b* fixedly mounted on an inner portion of the first sleeve 112*a*.

The first sleeve 112*a* may be formed by forging Cu or Al or sintering a Cu—Fe-based alloy powder or a SUS-based powder. However, the sleeve 112*a* is not limited to being manufactured in this scheme, but may be manufactured in various schemes. In addition, the second sleeve 112*b* may be formed by forging Cu or Al or sintering a Cu—Fe-based alloy powder or a SUS-based powder or being formed of other metal or polymer materials.

Here, the shaft 111 may be inserted into the shaft hole of the second sleeve 112*b* so as to have a micro clearance therebetween to form a bearing clearance C. The bearing clearance C may be filled with a lubricating fluid. At least one of an outer peripheral surface of the shaft 111 and an inner peripheral surface of the second sleeve 112*b* may be provided with upper and lower radial dynamic pressure grooves 114. Therefore, the rotation of the shaft 111 may be smoothly supported by a hydrodynamic radial bearing formed at the time of rotation of the shaft 111.

The radial dynamic pressure groove 114 may be formed in the inner surface of the second sleeve 112*b*, an inner portion of the shaft hole of the second sleeve 112*b*, and generate pressure so that the shaft 111 may smoothly rotate in a state in which the shaft 111 is spaced apart from the second sleeve 112*b* by a predetermined interval at the time of rotation thereof.

However, the radial dynamic pressure groove 114 is not limited to being formed in the inner surface of the second sleeve 112*b* as described above, but may also be formed in an outer peripheral portion of the shaft 111. In addition, the number of radial dynamic pressure grooves 114 is not limited.

The radial dynamic pressure groove 114 may have at least one of a herringbone pattern, a spiral pattern, and a helix pattern. However, the radial dynamic pressure groove 114 may have any shape as long as radial dynamic pressure may be generated.

In addition, an inner surface of the second sleeve 112*b* may be provided with depression parts depressed in the outer diameter direction between upper and lower portions of the second sleeve 112*b* and portions in which the radial bearings are formed. The portions in which the radial bearings are formed may be provided with bearing closure adhesion parts allowing the portions in which the radial bearings are formed to be more adjacent to the shaft 111 as compared to portions other than the portions in which the radial bearings are formed by the depression parts.

The bearing closure adhesion parts may include a first bearing closure adhesion part 165 positioned in an upper portion and a second bearing closure adhesion part 166 positioned in a lower portion. This case may correspond to the case in which radial bearings are provided as pairs in upper and lower portions. Therefore, when the number of radial bearings increases, the number of bearing closure adhesion parts also may increase. Each of the first and second bearing closure adhesion parts 165 and 166 may include a radial dynamic pressure groove 114 formed in an inner surface thereof.

Meanwhile, the upper and lower portions of the second sleeve 112*b* may be provided with the depression parts depressed in the outer diameter direction so as to be closely coupled to the first sleeve 112*a*.

Therefore, the depression parts may include a first depression part 162 positioned in an upper portion, a second depression part 163 positioned in a central portion, and a third depression part 164 positioned in a lower portion. Here, the second depression part 163 may also be provided so as to be closely adhered to an inner surface of the first sleeve 112*a*.

In addition, the inner surface of the first sleeve 112*a* and an outer surface of the second sleeve 112*b* may have a space part therebetween so as to be spaced apart from each other. However, since the space part is divided into upper and lower portions by the above described second depression part 163, the space part may include a first space part 171 provided at an upper portion and a second space part 172 provided at a lower portion.

In addition, the second sleeve 112*b* may be provided with through-holes allowing upper and lower portions thereof to be in communication with each other. The through-holes may include a first through-hole 173 allowing the first space part 171 to be in communication with the upper portion of the second sleeve 112*b*, a third through-hole 175 allowing the second space part 172 to be in communication with the lower portion of the second sleeve 112*b*, and a second through-hole 174 allowing the first space part 171 or the second space part 172 to be in communication with a slightly wide bearing clearance C formed by the second depression part 163. As shown in FIG. 2, the second through-hole 174 comprises a second upper through-hole 174*u* and a second lower through-hole 174*d*.

The first to third through-holes 173 to 175 may be linearly disposed in the axial direction. Therefore, the through-holes may be easily manufactured.

The upper and lower portions of the second sleeve 112*b* may be in communication with each other by the through-holes, and a bearing clearance C between the radial bearings provided as pairs in the upper and lower portions may be in communication with the through-holes.

With the structure described above, pressure of the lubricating fluid in the hydrodynamic bearing assembly 110 may be dispersed to maintain balance of the pressure, and air bubbles, or the like, present in the hydrodynamic bearing assembly 110 may be moved so as to be discharged by circulation.

Here, a lower end of the second sleeve 112b may be provided with the stopper 111a protruding from a lower end portion of the shaft 111 in the outer diameter direction. This stopper 111a may be caught by a lower portion of the second bearing closure adhesion part 166 provided in the second sleeve 112b.

Although not shown, the stopper 111a may be caught by a lower end surface of the first sleeve 112a, that is, a bottom surface of the first sleeve 112a rather than the second bearing closure adhesion part 166, to limit floating of the shaft 111 and the rotor 120.

The spindle motor 100 according to the embodiment of the present invention may use a fluid bearing. Generally, the spindle motor 100 may include a pair of upper and lower radial dynamic pressure grooves 114 for rotational stability to allow two fluid bearings to be formed. However, in the case of the motor using the hydrodynamic bearing, since the rotating member needs to rotate in a state in which it is floated at a predetermined height and thus does not contact a bottom plate (a cover member 113 in the present embodiment), the fluid may be continuously pumped downwardly in an axial direction.

Meanwhile, the sleeves 112a and 112b may include the cover member 113 coupled thereto at lower portions thereof in the axial direction to cover the shaft hole formed in the sleeves 112a and 112b, thereby preventing leakage of the lubricating fluid. Here, the first sleeve 112a may include the second sleeve 112b and the shaft 111 disposed in the shaft hole thereof.

The cover member 113 may receive the lubricating fluid in the shaft hole formed in the sleeves 112a and 112b to serve as a bearing supporting a lower surface of the shaft 111.

Further, the cover member 113 may be provided integrally with the second sleeve 112b. In this case, as shown in FIG. 2, the cover member 113 may cover the entire lower portion of the shaft hole of the first sleeve 112a.

The hub 121, a rotating member coupled to the shaft 111 and rotating together with the shaft 111, may configure the rotor 120 while simultaneously configuring the hydrodynamic bearing assembly 110. Hereinafter, the rotor 120 will be described in detail.

The rotor 120 may be a rotating structure provided to be rotatable with respect to the stator 130 and include the hub 121 having an annular ring-shaped magnet 125 provided on an outer peripheral surface thereof, wherein the annular ring-shaped magnet 125 corresponds to a core 131 to be described below, having a predetermined interval therebetween.

In other words, the hub 121 may be a rotating member coupled to the shaft 111 to rotate together with the shaft 111.

Here, as the magnet 125, a permanent magnet generating magnetic force having predetermined strength by alternately magnetizing an N pole and an S pole thereof in a circumferential direction may be used.

In addition, the hub 121 may include a first cylindrical wall part 122 fixed to an upper end of the shaft 111, a disk part 123 extended from an end portion of the first cylindrical wall part 122 in the outer diameter direction, and a second cylindrical wall part 124 protruding downwardly from an edge portion of the disk part 123 in the outer diameter direction, wherein the second cylindrical wall part 124 may include the magnet 125 coupled to an inner peripheral surface thereof.

The hub 121 may have a main wall part 126 extended downwardly in the axial direction so as to correspond to an outer portion of the upper portion of the first sleeve 112a. More specifically, the hub 121 may include the main wall part 126 extended from the disk part 123 downwardly in the axial direction. A liquid-vapor interface sealing the lubricating fluid may be formed between the outer portion of the first sleeve 112a and an inner portion of the main wall part 126.

In addition, an inner surface of the main wall part 126 may be tapered, such that an interval between the inner surface of the main wall part 126 and an outer surface of the first sleeve 112a widens in the downward axial direction to facilitate the sealing of the lubricating fluid. Further, the outer surface of the first sleeve 112a may also be tapered to facilitate the sealing of the lubricating fluid.

In addition, the outer surface of the main wall part 126 may be formed so as to correspond to an inner surface 136 of at least a portion of a mounting part 134 protruding upwardly from a base member 133 and may be stepped or tapered so that an interval between the main wall part 126 and the inner surface 136 becomes wide toward the downward axial direction.

The stator 130 may include the coil 132, the core 131, and the base member 133.

In other words, the stator 130 may be a fixed structure including the coil 132 generating electromagnetic force having a predetermined magnitude at the time of the application of power thereto, and a plurality of cores 131 having the coil 132 wound therearound.

The core 131 may be fixedly disposed on an upper portion of the base member 133 including a printed circuit board (not shown) having pattern circuits printed thereon, the upper surface of the base member 133 corresponding to the winding coil 132 may be provided with a plurality of coil holes having a predetermined size and penetrating through the base member 133 so as to expose the winding coil 132 downwardly, and the winding coil 132 may be electrically connected to the printed circuit board (not shown) so that external power is supplied thereto.

The outer peripheral surface of the first sleeve 112a may be fixed to the base member 133, and the core 131 having the coil 132 wound therearound may be inserted into the base member 133. In addition, the base member 133 and the first sleeve 112a may be connected to each other by applying an adhesive to an inner surface of the base member 133 or an outer surface of the first sleeve 112a.

In addition, the base member 133 may be provided with the mounting part 134 protruding upwardly in the axial direction. Therefore, the core 131 may be mounted on an outer surface of the base member 133, the above-mentioned first sleeve 112a may be fitted into and fixed to a portion of the inner surface thereof, and the outer surface of the main wall part 126 may be formed to correspond to another portion 136 of the inner surface thereof. The mounting part 134 may not be formed to be high so as to correspond to the outer surface of the main wall part 126.

Figure 3:
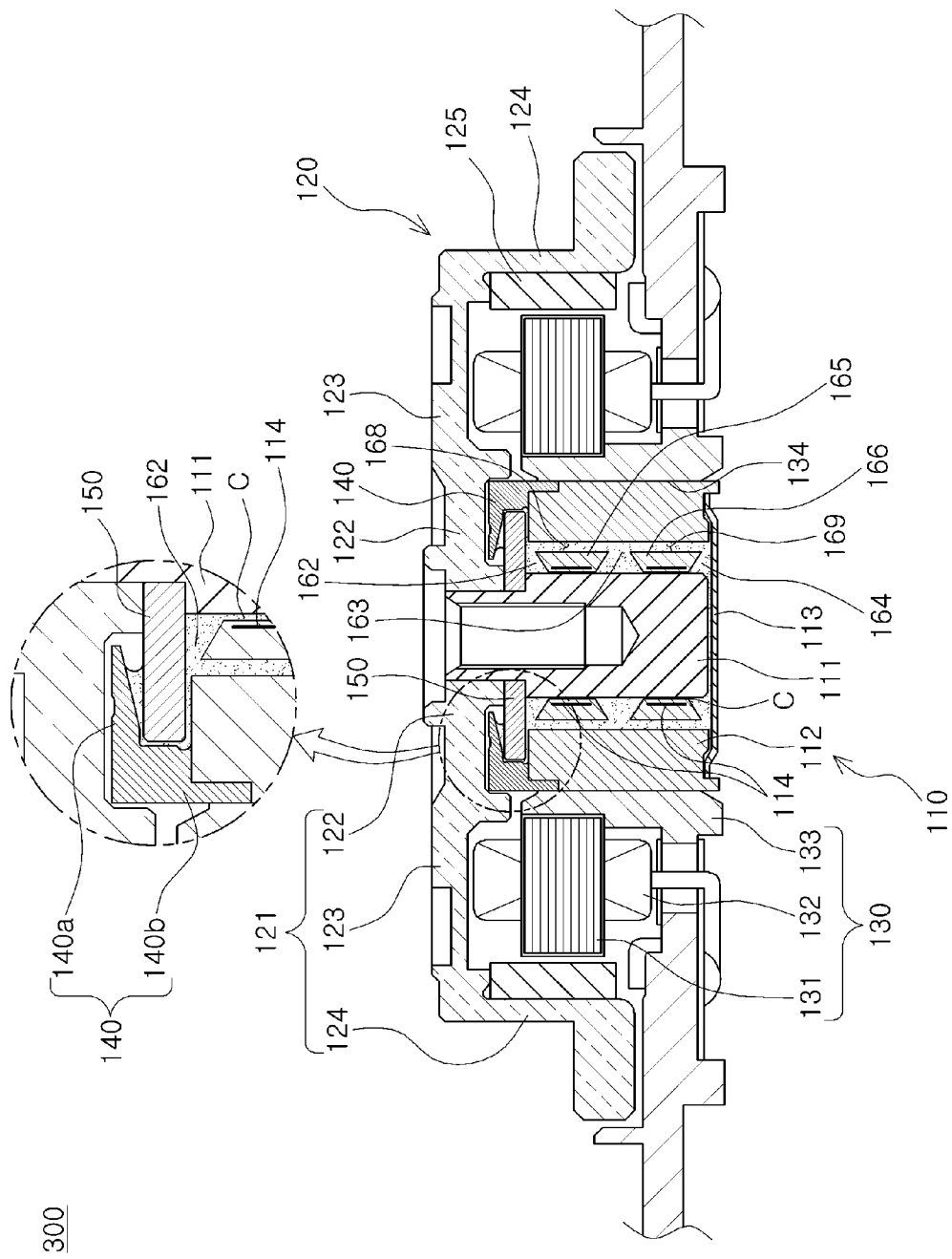

FIG. 3 is a cross-sectional view of a spindle motor according to the embodiment of the present invention.

Referring to FIG. 3, the spindle motor 300 including a hydrodynamic bearing assembly 110 according to the embodiment of the present invention may include the hydrodynamic bearing assembly 110 including a thrust plate 150 and a cap member 140, a stator 130 including a core 131 having a coil 132 wound therearound, and a rotor 120 including a hub 121.

The hydrodynamic bearing assembly 110 according to the embodiment of the present invention is different from that of the spindle motor 100 according to the embodiment of the present invention described with reference to FIG. 1 in that it includes the cap member 140. Therefore, the hydrodynamic bearing assembly 110 according to the embodiment of the present invention is different from that of the spindle motor 100 according to the embodiment of the present invention described with reference to FIG. 1 in that it includes a thrust plate 150 provided instead of the stopper and serving as the stopper. Since other components are the same as those of the spindle motor 100 described with reference to FIG. 1, a detailed description thereof will be omitted in order to prevent confusion and make a description of the present invention clear. Hereinafter, components different from those of the spindle motor 100 according to the embodiment of the present invention described with reference to FIG. 1 will be mainly described.

The thrust plate 150 may be mounted on the shaft 111 and disposed on upper surfaces of the first and second sleeves 112a and 112b to form a liquid-vapor interface between the thrust plate 150 and a cap member 140 to be described below, thereby sealing the lubricating fluid.

Furthermore, a thrust dynamic pressure groove generating thrust dynamic pressure may be formed in a lower surface of the thrust plate 150 or in at least one of the upper surfaces of the first and second sleeves 112a and 112b facing the lower surface of the thrust plate 150. The thrust dynamic pressure groove may have at least one of a herringbone pattern, a spiral pattern, and a helix pattern.

The cap member 140 may be a member mounted on the first sleeve 112a so as to be positioned over the thrust plate 150 to seal the lubricating fluid between the cap member 140 and the thrust plate 150.

The cap member 140 may include a horizontal part 140a disposed over the thrust plate and a vertical part 140b extended downwardly from an outer edge of the horizontal part 140a. That is, an inner peripheral surface of the vertical part 140b may be press-fitted into an outer peripheral surface of the first sleeve 112a or be bonded to the outer peripheral surface of the first sleeve 112a by an adhesive.

Figure 4:
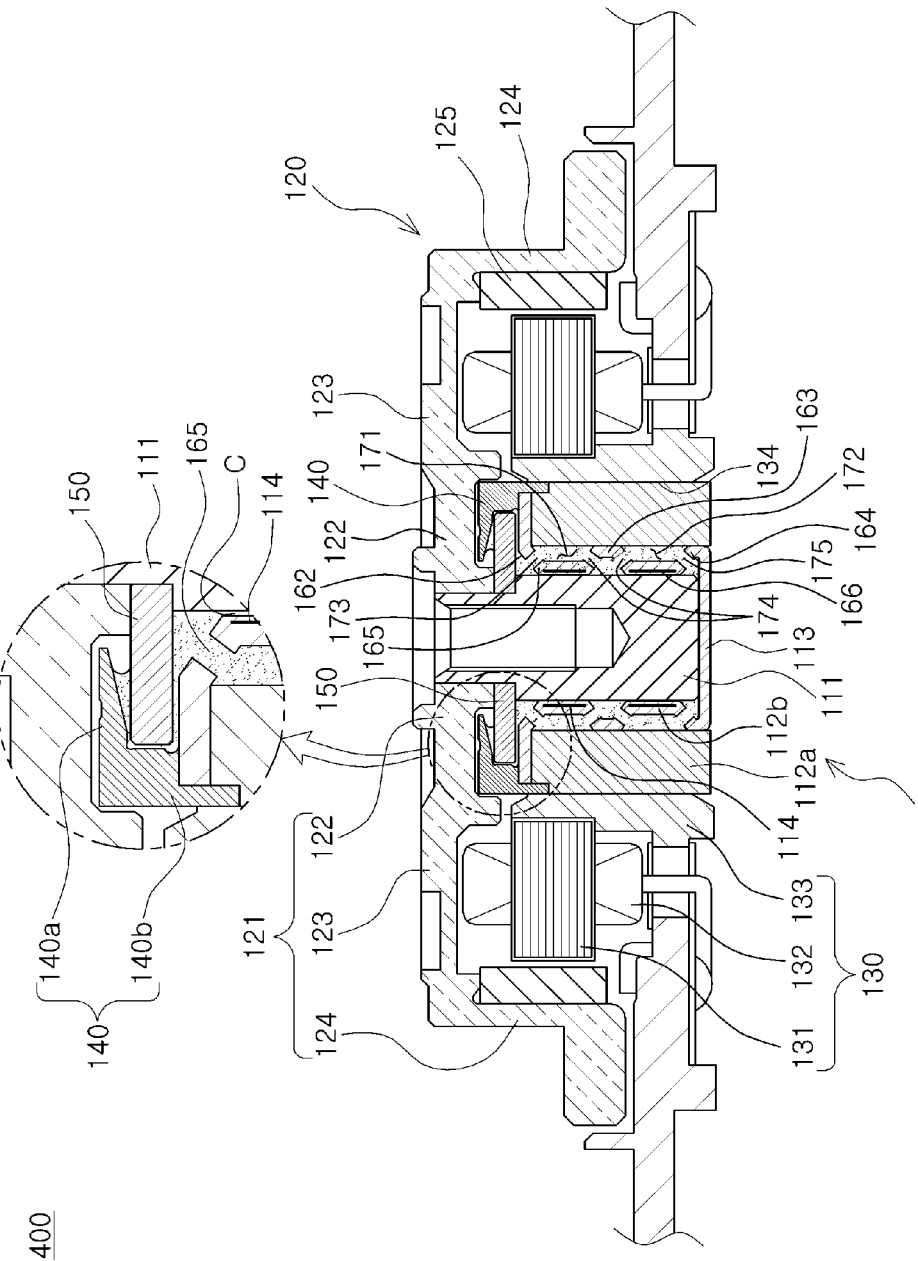

FIG. 4 is a cross-sectional view of the spindle motor according to the embodiment of the present invention.

Referring to FIG. 4, the spindle motor 400 including a hydrodynamic bearing assembly 110 according to the embodiment of the present invention may include the hydrodynamic bearing assembly 110 including a thrust plate 150 and a cap member 140, a stator 130 including a core 131 having a coil 132 wound therearound, and a rotor 120 including a hub 121.

The hydrodynamic bearing assembly 110 according to the embodiment of the present invention is different from that of the spindle motor 200 according to the embodiment of the present invention described with reference to FIG. 2 in that it includes the cap member 140. Therefore, the hydrodynamic bearing assembly 110 according to the embodiment of the present invention is different from that of the spindle motor 100 according to the embodiment of the present invention described with reference to FIG. 2 in that it includes a thrust plate 150 provided instead of the stopper and serving as the stopper. Since other components are the same as those of the spindle motor 100 described with reference to FIG. 1, a detailed description thereof will be omitted in order to prevent confusion and make a description of the present invention clear. Hereinafter, components different from those of the spindle motor 200 according to the embodiment of the present invention described with reference to FIG. 2 will be mainly described.

The thrust plate 150 may be mounted on the shaft 111 and disposed on upper surfaces of the first and second sleeves 112a and 112b to form a liquid-vapor interface between the thrust plate 150 and a cap member 140 to be described below, thereby sealing the lubricating fluid.

Furthermore, a thrust dynamic pressure groove generating thrust dynamic pressure may be formed in a lower surface of the thrust plate 150 or in at least one of the upper surfaces of the first and second sleeves 112a and 112b facing the lower surface of the thrust plate 150. The thrust dynamic pressure groove may have at least one of a herringbone pattern, a spiral pattern, and a helix pattern.

The cap member 140 may be a member mounted on the first sleeve 112a so as to be positioned over the thrust plate 150 to seal the lubricating fluid between the cap member 140 and the thrust plate 150.

The cap member 140 may include a horizontal part 140a disposed over the thrust plate and a vertical part 140b extended downwardly from an outer edge of the horizontal part 140a. That is, an inner peripheral surface of the vertical part 140b may be press-fitted into an outer peripheral surface of the first sleeve 112a or be bonded to the outer peripheral surface of the first sleeve 112a by an adhesive.

Figure 5:
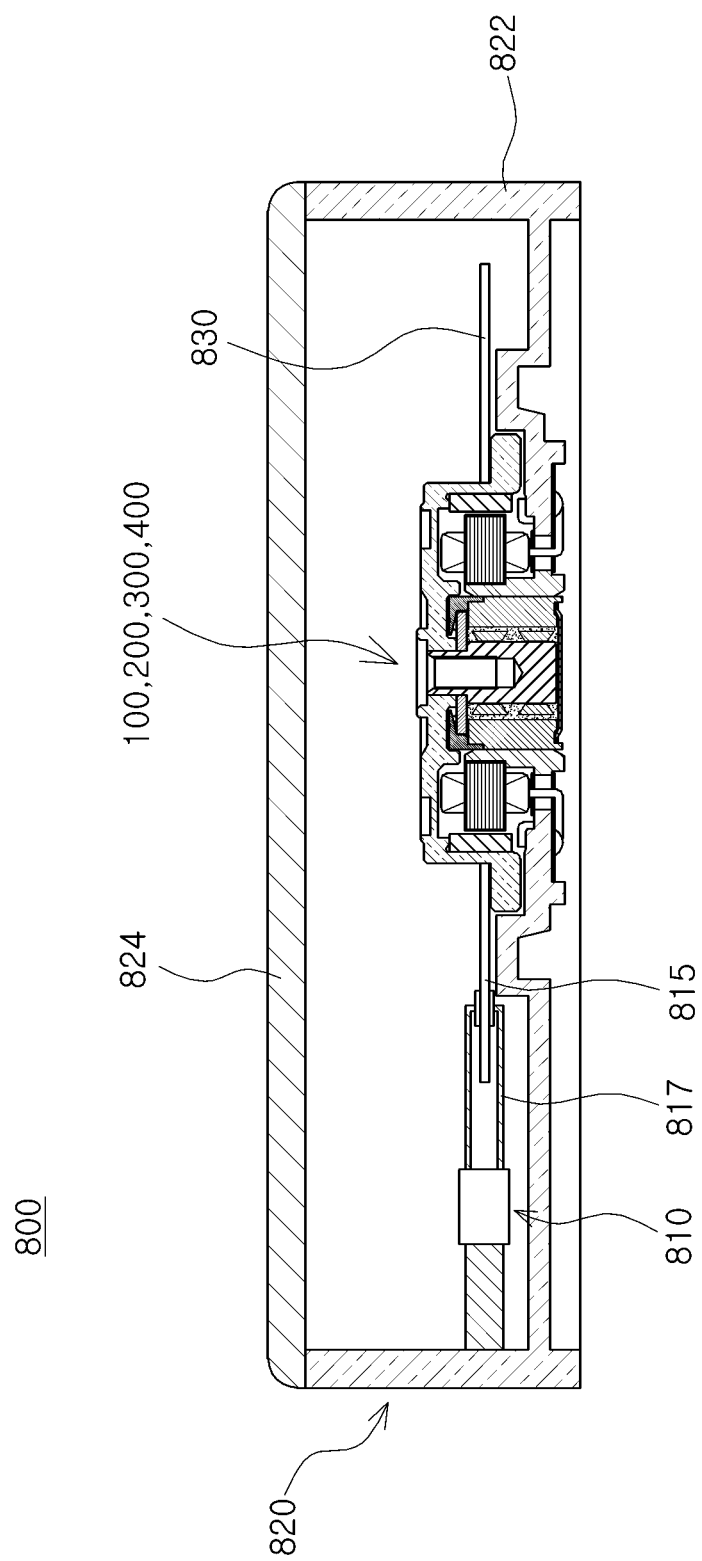
FIG. 5 is a schematic cross-sectional view of a disk driving device using the spindle motor according to the embodiment of the present invention.

FIG. 5 is a schematic cross-sectional view of a disk driving device using the spindle motor according to the embodiment of the present invention.

Referring to FIG. 5, a recording disk driving device 800 having the spindle motor 100, 200, 300, or 400 according to the embodiment of the present invention mounted therein may be a hard disk driving device and include the spindle motor 100, 200, 300, or 400, a head transfer part 810, and a housing 820.

The spindle motor 100, 200, 300, or 400 may have all the characteristics of the spindle motor according to the embodiments of the present invention described above and may have a recording disk 830 mounted thereon.

The head transfer part 810 may transfer a magnetic head 815 detecting information of the recording disk 830 mounted on the spindle motor 100, 200, 300, or 400 to a surface of the recording disk of which the information is to be detected.

Here, the magnetic head 815 may be disposed on a support part 817 of the head transfer part 810.

The housing 820 may include a motor mounting plate 822 and a top cover 824 shielding an upper portion of the motor mounting plate 822 in order to form an internal space receiving the spindle motor 100, 200, 300, or 400 and the head transfer part 810 therein.

As set forth above, according to the embodiments of the present invention, the hydrodynamic bearing assembly capable of improving motor performance by preventing the generation of the negative pressure may be provided.

In addition, the motor that may be stably operated even in the case that vibrations, external impacts, and the like are applied from the outside may be provided.

Further, the motor having a structure capable of rapidly discharging gas included in a lubricating fluid to the outside may be provided.

While the present invention has been shown and described in connection with the embodiments, it will be apparent to those skilled in the art that modifications and variations can be made without departing from the spirit and scope of the invention as defined by the appended claims.

What is claimed is:

1. A hydrodynamic bearing assembly comprising:

a first sleeve;

a second sleeve fixed to an inner surface of the first sleeve, the second sleeve including a shaft hole to have a shaft rotatably installed therein; and a cover member covering the shaft hole at a lower portion of the shaft hole in an axial direction, the inner surface of the first sleeve and an outer surface of the second sleeve being provided to form a space part therebetween, an inner surface of the second sleeve being provided with depression parts depressed in an outer diameter direction between portions in which radial bearings are formed, such that the portions in which the radial bearings are formed are provided with bearing closure adhesion parts allowing the portions in which the radial bearings are formed to be closer to the shaft than portions other than the portions in which the radial bearings are formed, an upper portion of the space part being provided with a first upper through-hole in communication with the shaft hole, the upper portion of the space part being provided with a second upper through-hole in communication with the depression part, and a lower portion of the space part being provided with a second lower through-hole that is in communication with the depression part, and the lower portion of the space part being provided with a third through-hole that is in communication with the shaft hole, wherein an upper end and a lower end of the inner surface of the first sleeve are coupled to the outer surface of the second sleeve.

2. The hydrodynamic bearing assembly of claim 1, wherein upper and lower portions of the second sleeve are depressed in the outer diameter direction so as to be coupled to the first sleeve.

3. The hydrodynamic bearing assembly of claim 1, wherein the cover member is provided integrally with the second sleeve.

4. The hydrodynamic bearing assembly of claim 1, further comprising a thrust plate provided with the shaft so as to be positioned between a cap member fixed to an upper portion of the first sleeve and the first sleeve.

5. The hydrodynamic bearing assembly of claim 1, further comprising a stopper provided with the shaft so as to be caught by a lower end of the lowermost bearing closure adhesion part among the bearing closure adhesion parts provided in the second sleeve.

6. The hydrodynamic bearing assembly of claim 1, wherein the depression parts are adhered to the inner surface of the first sleeve.

* * * * *